United States Patent
Dillard et al.

(10) Patent No.: US 10,858,123 B2
(45) Date of Patent: Dec. 8, 2020

(54) METHODS AND SYSTEMS FOR DETECTING DATA ANOMALIES

(71) Applicant: HONEYWELL INTERNATIONAL INC., Morris Plains, NJ (US)

(72) Inventors: Michael Dillard, St. Louis Park, MN (US); Stephen Whitlow, St. Louis Park, MN (US); Umut Orhan, Kirkland, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 240 days.

(21) Appl. No.: 16/014,082

(22) Filed: Jun. 21, 2018

(65) Prior Publication Data
US 2019/0389599 A1 Dec. 26, 2019

(51) Int. Cl.
| | | |
|---|---|---|
| *B64F 5/60* | (2017.01) | |
| *B64D 45/00* | (2006.01) | |
| *G01D 18/00* | (2006.01) | |
| *G07C 5/08* | (2006.01) | |

(52) U.S. Cl.
CPC ............ *B64F 5/60* (2017.01); *B64D 45/00* (2013.01); *G01D 18/00* (2013.01); *G07C 5/085* (2013.01); *G07C 5/0808* (2013.01); *G07C 5/0825* (2013.01)

(58) Field of Classification Search
CPC .......... B64F 5/60; B64D 45/00; G01D 18/00; G07C 5/0808; G07C 5/085; G07C 5/0825
See application file for complete search history.

(56) References Cited

U.S. PATENT DOCUMENTS

| | | | |
|---|---|---|---|
| 3,411,132 A | 11/1968 | Priestley | |
| 3,505,641 A | 4/1970 | Boskovich | |
| 4,193,059 A | 3/1980 | Harris | |
| 6,112,141 A * | 8/2000 | Briffe | G01C 23/00 345/1.3 |
| 6,285,298 B1 | 9/2001 | Gordon | |
| 7,161,501 B1 | 1/2007 | Lynch et al. | |
| 9,218,232 B2 | 12/2015 | Khalastchi et al. | |
| 10,042,364 B1 * | 8/2018 | Hayward | G01C 21/3415 |

(Continued)

FOREIGN PATENT DOCUMENTS

EP   3258426 A1   12/2017

OTHER PUBLICATIONS

Chu, Eric et al., "Detecting Aircraft Performance Anomalies from Cruise Flight Data," American Institute of Aeronautics and Astronautics, 2010.

(Continued)

*Primary Examiner* — Behrang Badii
*Assistant Examiner* — Daniel L Greene
(74) *Attorney, Agent, or Firm* — Lorenz & Kopf, LLP

(57) ABSTRACT

Methods and systems are provided for monitoring sensors and other data sources and detecting data anomalies. One exemplary method involves determining a probable range for a metric influenced by a behavior a sensor based at least in part on historical data associated with the sensor, identifying an anomalous condition with respect to the sensor based on a relationship between a current value for the metric indicative of a current behavior of the sensor and the probable range, and providing a graphical indication of the anomalous condition on a display device.

20 Claims, 8 Drawing Sheets

(56) References Cited

U.S. PATENT DOCUMENTS

| | | | |
|---|---|---|---|
| 2001/0044912 A1* | 11/2001 | Francis | G06F 11/0751 |
| | | | 714/30 |
| 2004/0163079 A1* | 8/2004 | Noy | G06F 11/3409 |
| | | | 717/154 |
| 2009/0216393 A1 | 8/2009 | Schimert | |
| 2011/0166699 A1* | 7/2011 | Palmquist | B67D 3/0041 |
| | | | 700/236 |
| 2011/0224868 A1* | 9/2011 | Collings, III | G07C 5/085 |
| | | | 701/33.4 |
| 2012/0296899 A1* | 11/2012 | Adams | G16H 10/40 |
| | | | 707/736 |
| 2015/0006021 A1 | 1/2015 | Darbonneau et al. | |
| 2015/0206053 A1* | 7/2015 | Hayden | G06N 5/02 |
| | | | 706/46 |
| 2016/0217627 A1 | 7/2016 | Khalaschi et al. | |
| 2017/0052072 A1* | 2/2017 | Beaven | G05B 23/0267 |
| 2017/0088290 A1 | 3/2017 | Szeto | |
| 2017/0243413 A1 | 8/2017 | Haggerty et al. | |
| 2017/0364818 A1* | 12/2017 | Wu | F16H 55/30 |
| 2019/0268360 A1* | 8/2019 | Yamanashi | H04L 63/1425 |

OTHER PUBLICATIONS

Deckert et al., F-8 DFBW Sensor Failure Identification Using Analytic Redundancy, IEEE Transactions on Automatic Control, Oct. 1977, pp. 795-803, vol. 6.

* cited by examiner

METHODS AND SYSTEMS FOR DETECTING DATA ANOMALIES

TECHNICAL FIELD

The subject matter described herein relates generally to electrical systems, and more particularly, embodiments of the subject matter relate to aircraft systems and data validation methods for detecting and diagnosing avionics data anomalies based on sensor behavior.

BACKGROUND

While various forms of automation have been incorporated into vehicles such as aircraft, a vehicle operator often has to manually operate the vehicle in response to abnormal events or various other conditions or scenarios. For example, in response to abnormal events during flights, pilots often must rely upon onboard instruments in conjunction with their personal training and airmanship to fly the aircraft. A pilot's ability to safely aviate, navigate, and communicate can be challenged when one or more instruments malfunction or become unreliable. Accordingly, modern aircraft typically include redundant sensors and data systems. Logical comparisons have been utilized to compare data outputs against one another to identify discrepancies that exceed thresholds, thereby notifying pilots of potential anomalies, which, in turn, allows pilots to determine which sensor or system is unreliable and switch to a reliable data source.

Though redundancy is generally effective, in some scenarios, it can be difficult to determine which data source is reliable, and within the amount of time available to a pilot to assess the situation without compromising situational awareness and safe operation of flight. For example, when redundant sensors or systems are each outputting faulty data, neither the pilot nor the automation system that consumes the data may be able to determine which data source, if any, can be trusted. Other incidents have occurred where redundant sensors have become frozen or otherwise stuck in a persistent state where their output data matches, and thus, does not provide any indication of the potential anomalous output data and could result in valid data being identified as anomalous by virtue of a discrepancy between the valid data with respect to matching invalid data. Accordingly, it is desirable to provide improved data validation methods and systems to improve the detection, diagnosis, and pilot notification of data anomalies that may otherwise go undetected using conventional approaches.

BRIEF SUMMARY

Methods and systems are provided for monitoring sensor outputs and detecting data anomalies. One exemplary method of monitoring a sensor involves determining a probable range for a metric influenced by a behavior the sensor based at least in part on historical data associated with the sensor, identifying an anomalous condition with respect to the sensor based on a relationship between a current value for the metric indicative of a current behavior of the sensor and the probable range, and providing a graphical indication of the anomalous condition on a display device.

Another embodiment of a method of detecting data anomalies is provided. The method involves obtaining a first value for a first output from a first data source onboard an aircraft, obtaining a second value for a second output from a second data source onboard the aircraft, determining a probable range of values for the second output based at least in part on the first value and a historical relationship between the first output and the second output, detecting an anomalous condition when the second value is outside the probable range of values, and initiating a remedial action in response to detecting the anomalous condition.

In another embodiment, an aircraft system is provided. The aircraft system includes a sensor onboard an aircraft to output a first measurement value indicative of a characteristic sensed by the sensor, a data source onboard the aircraft to output a second value, a data storage element maintaining historical data indicative of a historical relationship between the sensor and the data source, a display device onboard the aircraft, and a processing system coupled to the sensor, the data source, the data storage element, and the display device to determine an expected behavior for the sensor based at least in part on the second value and the historical relationship between the sensor and the data source, identify an anomalous condition in response to a discrepancy between the first measurement value and the expected behavior, and provide graphical indication of the anomalous condition on the display device.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
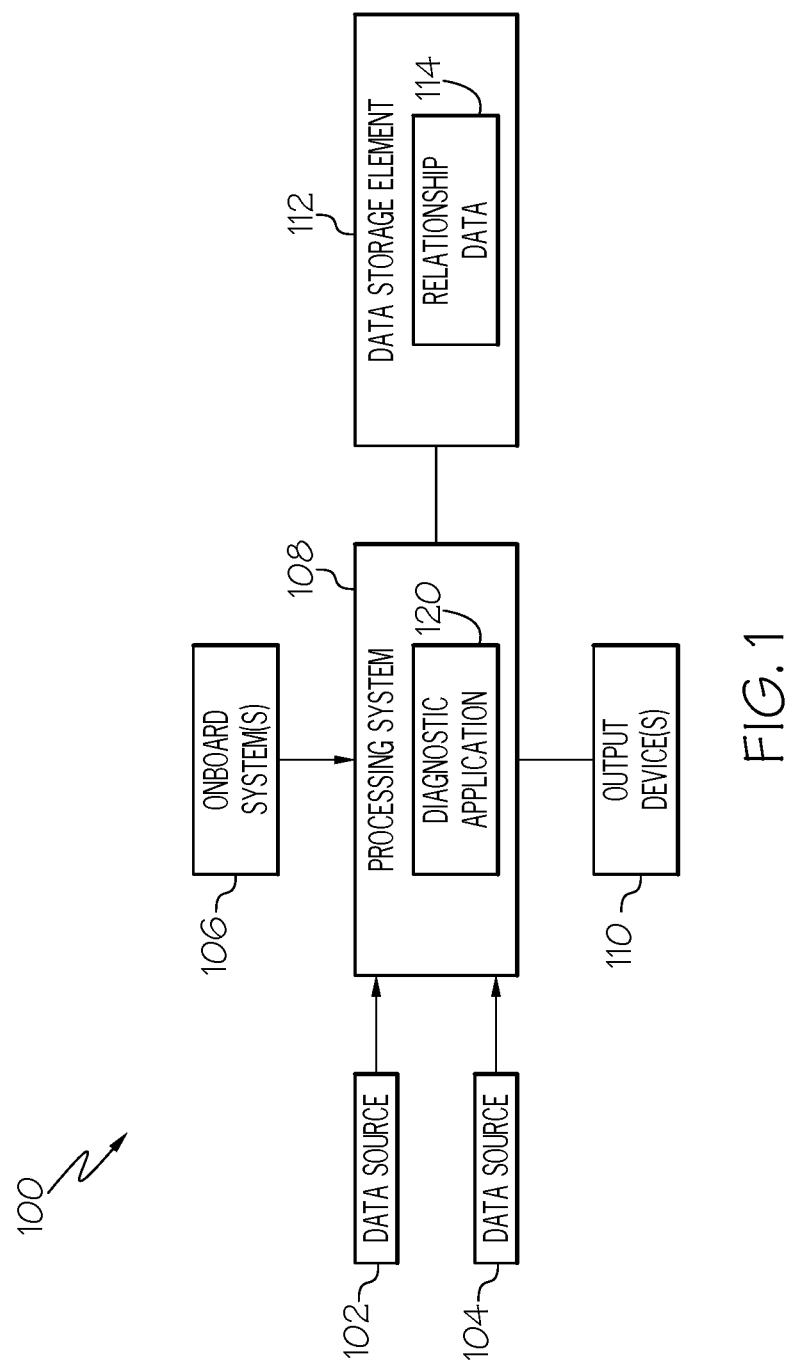
FIG. 1 is a block diagram of an electrical system suitable for use onboard a vehicle such as an aircraft in an exemplary embodiment.

Embodiments of the subject matter described herein generally relate to systems and methods for validating data sources and automatically detecting and diagnosing data anomalies based on the current behavior of a sensing arrangement. While the subject matter described herein could be utilized in various applications or in the context of various different types of vehicles (e.g., automobiles, marine vessels, trains, or the like), exemplary embodiments are described herein primarily in the context of avionics systems and sensors located onboard or otherwise associated with an aircraft.

In exemplary embodiments, historical data associated with a sensor is utilized to determine a probable range of values for a metric that is influenced by and/or related to the output of the sensor. For example, in one or more embodiments, a probable range of measurement values for a commonly-sensed quantity or characteristic by a redundant sensor may be determined based on a relationship between historical measurement data associated with the two sensors measuring the same quantity or characteristic. In another embodiment, a probable range of values for a calculated parameter correlative to the sensor output may be determined based on a relationship between historical values for the calculated parameter with respect to historical measurement data output by the sensor. In yet other embodiments, a probable range of values representing an expected temporal behavior of the sensor may be determined based on the historical measurement data associated with the sensor.

As described in greater detail below, an anomalous condition is detected or otherwise identified when the current sensor behavior does not fall within the probable range representing the expected sensor behavior given current operating conditions. For example, an anomalous condition may be detected when the current output value for the sensor is not within a probable range of values determined based on the current output value of a redundant sensor and the historical relationship between the two sensors, or vice versa. In this regard, it should be noted that the probable range of values may vary depending on the current output value of one of the sensors. In other embodiments, an anomalous condition may be detected when the current output value for the sensor is not within a probable range of values determined based on the current calculated value for another parameter correlative to the sensor output, or vice versa. In yet other embodiments, an anomalous condition may be detected when a variance or other statistical metric indicative of temporal behavior associated with the current output value for the sensor does not correspond to the historical temporal behavior of that sensor given the current operating conditions (e.g., the current flight phase, the current altitude, the current temperature or other environmental conditions, and/or the like).

When an anomalous condition is detected, one or more remedial actions may be performed, including providing a graphical indication of the anomalous condition. For example, a graphical indication that a particular data source is invalid, anomalous, or otherwise low in confidence may be presented on an onboard display device to mark or otherwise indicate to a pilot or other vehicle operator that any presented measurement values may be unreliable, or the output data associated with that data source may simply be removed from the display. In other embodiments, one or more visually distinguishable characteristics or graphical effects or utilized when rendering a value being presented to indicate the presented value is potentially invalid, anomalous, or otherwise associated with low confidence (e.g., by desaturating or fading the presented value). In this regard, in one or more embodiments, in response to detecting an anomalous condition, one or more diagnostic processes are performed to identify the data source exhibiting the anomaly before providing graphical indication of the data sourced identified as anomalous. In addition to graphical indicia of data anomalies, in one or more embodiments, output data from a data source identified as being anomalous may also be disabled or excluded from use in one or more control algorithms or calculations to be performed by other systems to avoid further propagating data anomalies. Additionally, in some embodiments, an entry in a maintenance log, event log, or the like may be created for a detected anomalous condition that maintains (e.g., in data storage element 112) an association between the output values of the respective data sources at the time of the anomalous condition along with information identifying the current operating conditions and aircraft status at the time of the anomalous condition. Such entries could also be utilized to trigger an update to the probable or expected relationships (e.g., in the event of a false positive).

It should be noted that the subject matter described herein may also be adapted to detect and diagnose data anomalies multi-dimensionally across multiple different data sources. For example, based on the current output data from two different data sources (or current values for metrics calculated based on the current output data), a probable range of values for a metric influenced by the output data from a third data source may be determined based on historical relationships between the output data (or calculated metrics) for the three different data sources. Such embodiments may be capable of detecting a data anomaly when one-to-one comparisons between any two of the three data sources would not otherwise indicate an anomaly. In such embodiments, additional relationships between different data sources having lower dimensionality may be utilized to diagnose the cause of the data anomaly or otherwise attribute the anomaly to a particular data source.

For example, if a discrepancy is detected between an angle of attack output by a first data source (e.g., an angle of attack sensor), a calibrated airspeed output by a second data source (e.g., air data computer (ADC)), and an inertial vertical speed output by a third data source (e.g., a variometer), the respective outputs of the data sources may be individually compared to the output of a fourth data source (e.g., a pitch angle output by an inertial reference system) to identify an anomaly with respect to only one of the three data sources, and thereby diagnose that data source as the cause of the anomalous condition. If the current angle of attack output is not within a probable range determined based on the current pitch angle and the historical relationship between the angle of attack and the pitch angle while the current calibrated airspeed and inertial vertical speed are within their respective probable ranges based on their respective historical statistical relationships to the pitch angle, the angle of attack sensor may be diagnosed as exhibiting the anomaly.

FIG. 1 depicts an exemplary embodiment of an electrical system 100 suitable for detecting and diagnosing data anomalies with respect to one or more data sources 102, 104 onboard a vehicle, such as an aircraft. The illustrated system 100 includes a plurality of data sources 102, 104 and one or more additional onboard systems 106 coupled to a processing system 108 that implements, executes, or otherwise supports a diagnostic application 120 capable of detecting and diagnosing an anomalous condition with respect to one of the data sources 102, 104 and providing one or more indicia of the data anomaly via an output interface 110, such as a display device. It should be appreciated that FIG. 1 is a simplified representation of an electrical system 100 for purposes of explanation and not intended to limit the subject matter in any way. In this regard, it will be appreciated that in practice, an electrical system 100 onboard a vehicle such as an aircraft may include any number of different data sources and onboard systems configured to support operation of the aircraft, and the subject matter described herein is not limited to any particular type or number of onboard data sources or systems.

In the illustrated embodiment, the data sources 102, 104 generally represent an electrical component or device that outputs or otherwise provides one or more electrical signals indicative of a value for a metric that is correlative to or indicative of one or more characteristics (or conditions) sensed, measured, detected, or otherwise quantified by one or more sensing elements (or sensors). In various embodiments, one or more of the data sources 102, 104 includes or is otherwise realized as a sensing arrangement comprising one or more sensing elements that sense, measure, detect, or otherwise quantify a characteristic and output one or more electrical signals representative of the value or state of that characteristic. For example, a data source 102, 104 onboard an aircraft could include, without limitation, one or more angle of attack sensors, pressure sensors, inertial sensors, velocity sensors, accelerometers, gyroscopes, pitot tubes, barometers, or radio altimeters. In some embodiments, the data sources 102, 104 are realized as redundant sensors or systems that sense, measure, detect, or otherwise quantify the same characteristic.

In some embodiments, one or more of the data sources 102, 104 is realized as an onboard system, device, or component that calculates, computes, calibrates, estimates, or otherwise determines a current value for a metric based on one or more current output values from one or more sensors, systems, or other data sources onboard the aircraft. For example, a data source 102, 104 could be a navigation system, inertial reference system, flight control system, flight management system (FMS), or other system that calculates a value for a metric using an output value from one or more other data sources or systems onboard the aircraft.

In the embodiment of FIG. 1, the onboard system(s) 106 generally represent any sort of electrical, mechanical, hydraulic, pneumatic, environmental, or propulsion systems configured to provide information or data that characterizes or is otherwise indicative of a current operational status of the vehicle. For example, in the case of an aircraft, the onboard vehicle systems 106 could include or otherwise be realized as any one or more of the following: a flight management system (FMS), a communications system, a navigational system, a weather system, a radar system, an autopilot system, an autothrust system, a landing gear system, a flight control system, hydraulics systems, pneumatics systems, environmental systems, electrical systems, engine systems, trim systems and/or another avionics system. As described in greater detail below, the processing system 108 is coupled to the onboard system(s) 106 to obtain information indicative of the current operational status of the aircraft, such as, for example, the current flight phase, the current altitude, the current aircraft configuration, the current meteorological conditions, and/or other operating conditions that may influence the relationships between the output data provided by other onboard data sources 102, 104. For example, mathematical or statistical relationships between outputs from different data sources 102, 104 may vary during flight depending on the current phase of flight, the current physical configuration of the aircraft, the current meteorological conditions (e.g., temperature, winds, precipitation, and/or the like). Accordingly, the current status information provided by the onboard system(s) 106 may be utilized by the diagnostic application 120 to account for the current real-time operating conditions when determining the probable relationship or expected behavior of the output of one data source 102, 104 with respect to another data source 102, 104.

In exemplary embodiments, the output device 110 includes one or more electronic display devices onboard the aircraft for presenting data and/or information provided by one or more data sources 102, 104, 106 onboard the aircraft. In exemplary embodiments, a display device is coupled to the processing system 108, with the processing system 108 and/or diagnostic application 120 providing graphical indicia of data anomalies to a pilot or other vehicle operator on the display device. For example, the processing system 108 and/or diagnostic application 120 may modify the rendering of potentially anomalous output data provided by a data source 102, 104 on the display device to indicate that the output data is potentially unreliable, or the processing system 108 and/or diagnostic application 120 may automatically mark, designate, or otherwise indicate that presented output data from the data source 102, 104 is potentially unreliable. In yet other embodiments, the processing system 108 and/or diagnostic application 120 may mask or remove previously presented output data from the data source 102, 104 from the display in response to identifying an anomalous condition with respect to that data source 102, 104. Additionally, in some embodiments, the output device 110 may include a speaker or other audio output device that may be utilized by the processing system 108 and/or diagnostic application 120 to provide an auditory indication of a potentially unreliable data source 102, 104.

Figure 2:
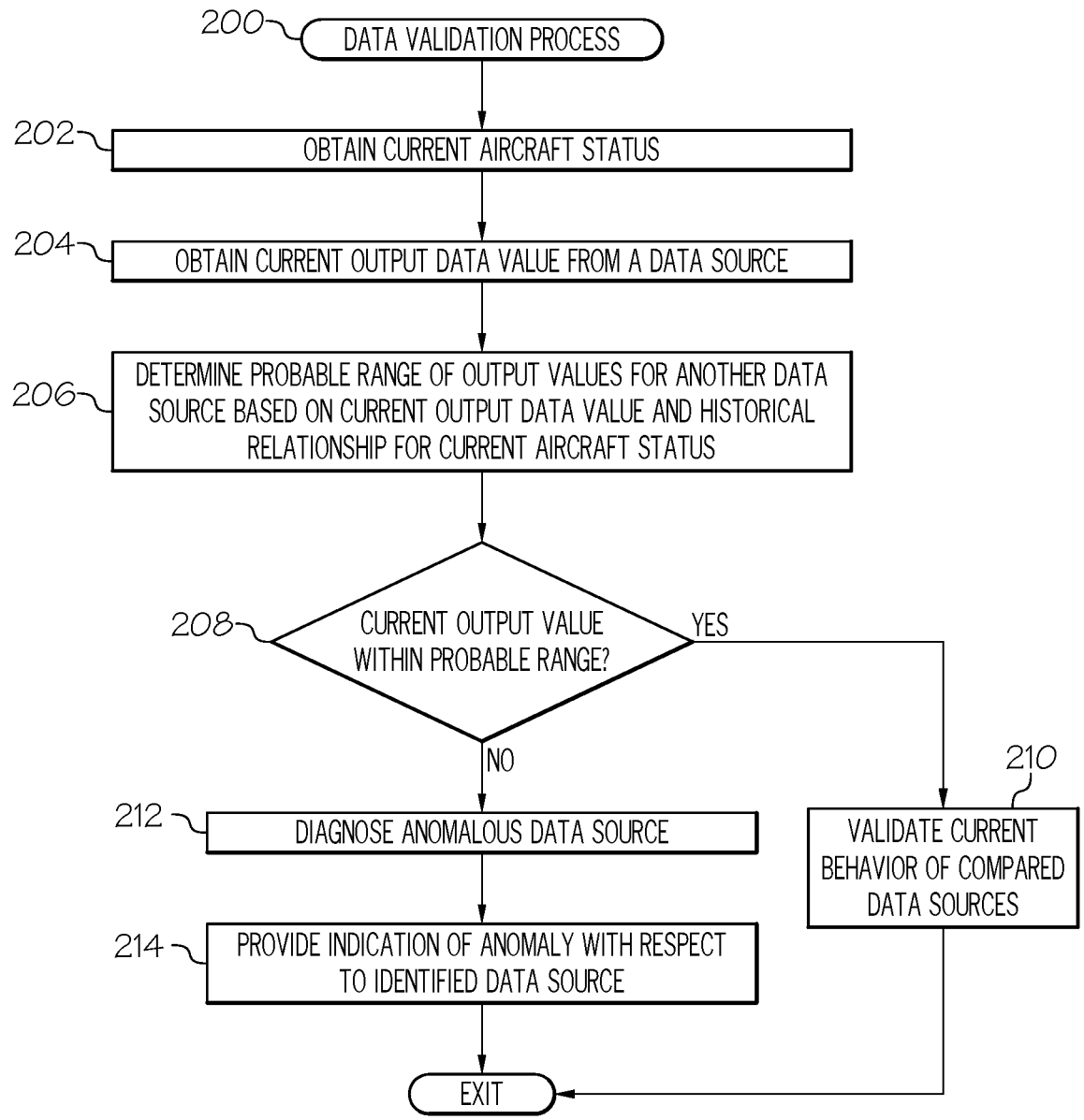
FIG. 2 is a flow diagram of an exemplary data validation process suitable for implementation by or in conjunction with the system of FIG. 1 in accordance with one or more exemplary embodiments.

The processing system 108 generally represents the hardware, software, and/or firmware components (or a combination thereof), which is communicatively coupled to the various elements of the system 100 and configured to support the data validation process 200 of FIG. 2 and perform additional tasks and/or functions described herein. Depending on the embodiment, the processing system 108 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 108 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 108 may include processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 108, or in any practical combination thereof. In the illustrated embodiment, the processing system 108 includes or otherwise accesses a data storage element 112 (or memory) capable of storing code or other computer-executable programming instructions that, when read and executed by the processing system 108, cause the processing system 108 to generate, implement, or otherwise execute the diagnostic application 120 that supports or otherwise performs certain tasks, operations, functions, and/or processes described herein.

The data storage element 112 generally represents any sort of non-transitory short- or long-term storage media capable of storing code, computer-executable programming instructions, and/or other data. Depending on the embodiment, the data storage element 112 may include or otherwise be physically realized using random access memory (RAM), read only memory (ROM), flash memory, registers, a hard disk, or another suitable data storage medium known in the art or any suitable combination thereof. Moreover, in some embodiments, the data storage element 112 may be realized as a database or some other remote data storage or device that is communicatively coupled to the processing system 108 via a communications network. In such embodiments, data maintained at the data storage element 112 may be downloaded or otherwise retrieved by the processing system 108 and stored locally at the processing system 108 or an onboard data storage element.

In exemplary embodiments, the data storage element 112 stores or otherwise maintains relationship data 114 that is indicative of the probable or expected relationships between output data values from different data sources. In this regard, in some embodiments, the relationship data 114 may include historical operational data including concurrent or contemporaneous output data values from the respective data sources 102, 104 and concurrent operational information from one or more other onboard systems 106. The relationship between the historical output data values from a first data source 102 and historical output data values from a second data source 104 over the same time period may be analyzed or otherwise compared to one another to quantify or otherwise characterize the relationship between the output data values for the operational conditions associated with the time period. For example, a statistical or probabilistic relationship characterizing the relative behavior of the respective outputs of two data sources 102, 104 may be determined by relating or comparing their respective output data values having the same or substantially similar (e.g., within a threshold time difference) sampling times. The statistical or probabilistic relationship between two data sources 102, 104 may then be stored or otherwise maintained in association with the concurrent operating conditions (e.g., a particular flight phase, aircraft configuration, meteorological conditions, and/or the like). In this regard, the relationship data 114 may also include threshold deviations or other threshold values or metrics determined based on historical operational data, which, in turn, may be utilized to detect anomalies when a pair of data sources are not exhibiting their probable or expected relationship given the current, real-time operating conditions.

In practice, historical operational data for different data sources 102, 104 and concurrent operational conditions may be obtained by a remote server or other computing device for a plurality of different flights and from a plurality of different aircraft. For example, for a given make and model of aircraft, a remote server may obtain historical operational data by uploading or otherwise transferring data from the flight data recorder (FDR), quick access recorder (QAR), or other onboard data recording devices from various different instances of that type of aircraft. The operational data may then be broken down into different data sets corresponding to different operating conditions. Relationships between output data values for different data sources may then be analyzed using the different data sets to quantify the statistical or probabilistic relationships between output data values for different data sources given a particular operating condition. In such embodiments, the functions, equations, probabilities, statistical metrics, or other parameters quantifying the relationships between different data sources for different operating conditions may be downloaded or otherwise retrieved by the processing system 108 and/or diagnostic application 120 (e.g., via an onboard communications system 106) and stored or maintained in the data storage element 112 as the relationship data 114, rather than storing larger data sets and analyzing historical relationships in real-time during flight.

FIG. 2 depicts an exemplary embodiment of a data validation process 200 suitable for use in detecting and diagnosing data anomalies in an electrical system, such as the electrical system 100 of FIG. 1. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the data validation process 200 may be performed by different elements of the system 100; that said, for purposes of explanation, the data validation process 200 may be described herein in context of being performed primarily by the processing system 108 and/or the diagnostic application 120. It should be appreciated that the data validation process 200 may include any number of additional or alternative tasks, the tasks need not be performed in the illustrated order and/or the tasks may be performed concurrently, and/or the data validation process 200 may be incorporated into a more comprehensive procedure or process having additional functionality not described in detail herein. Moreover, one or more of the tasks shown and described in the context of FIG. 2 could be omitted from a practical embodiment of the data validation process 200 as long as the intended overall functionality remains intact. Additionally, for purposes of explanation, the data validation process 200 is primarily described herein in the context of an aircraft or aviation-related application; however, it should be appreciated that the data validation process 200 is not necessarily limited to aircraft systems, and could be implemented in an equivalent manner for any electrical system including any number of sensors or data sources.

Referring to FIG. 2, and with continued reference to FIG. 1, in the illustrated embodiment, the data validation process 200 initializes by obtaining, identifying, or otherwise determining status information characterizing current operations of the aircraft (task 202). In this regard, the processing system 108 and/or diagnostic application 120 obtains, from one or more onboard systems 106, information characterizing the current operational status of the aircraft, such as, for example, the current flight phase of the aircraft, the current aircraft configuration (e.g., engine status, flap positions, landing gear position, and/or the like), the current meteorological conditions about the aircraft, the current altitude of the aircraft, and/or the like.

The data validation process 200 continues by receiving or otherwise obtaining the current output data value for a first data source to be validated with respect to another data source or output data value (task 204). Based on the current output data value from the first data source and the current aircraft status, the data validation process 200 calculates or otherwise determines a probable range for another output data value based on the current output data value and the historical relationship between the two output data values identified for the current aircraft status using historical operational data (task 206). For example, historical output data values associated with the first data source 102 may be compared with concurrent or contemporaneous historical output data values associated with the second data source 104 obtained during preceding operations when in the current flight phase to determine a statistical or probabilistic relationship between the output data values for the current flight phase. In this regard, a probable operating region representative of the expected behavioral relationships between the two data sources 102, 104 may be determined using the historical operational data associated with the two data sources for the current flight phase. Based on the current output value of one data source 102, a probable range of output values may be determined for the other data source 104 using the probable operating region.

Figure 3:
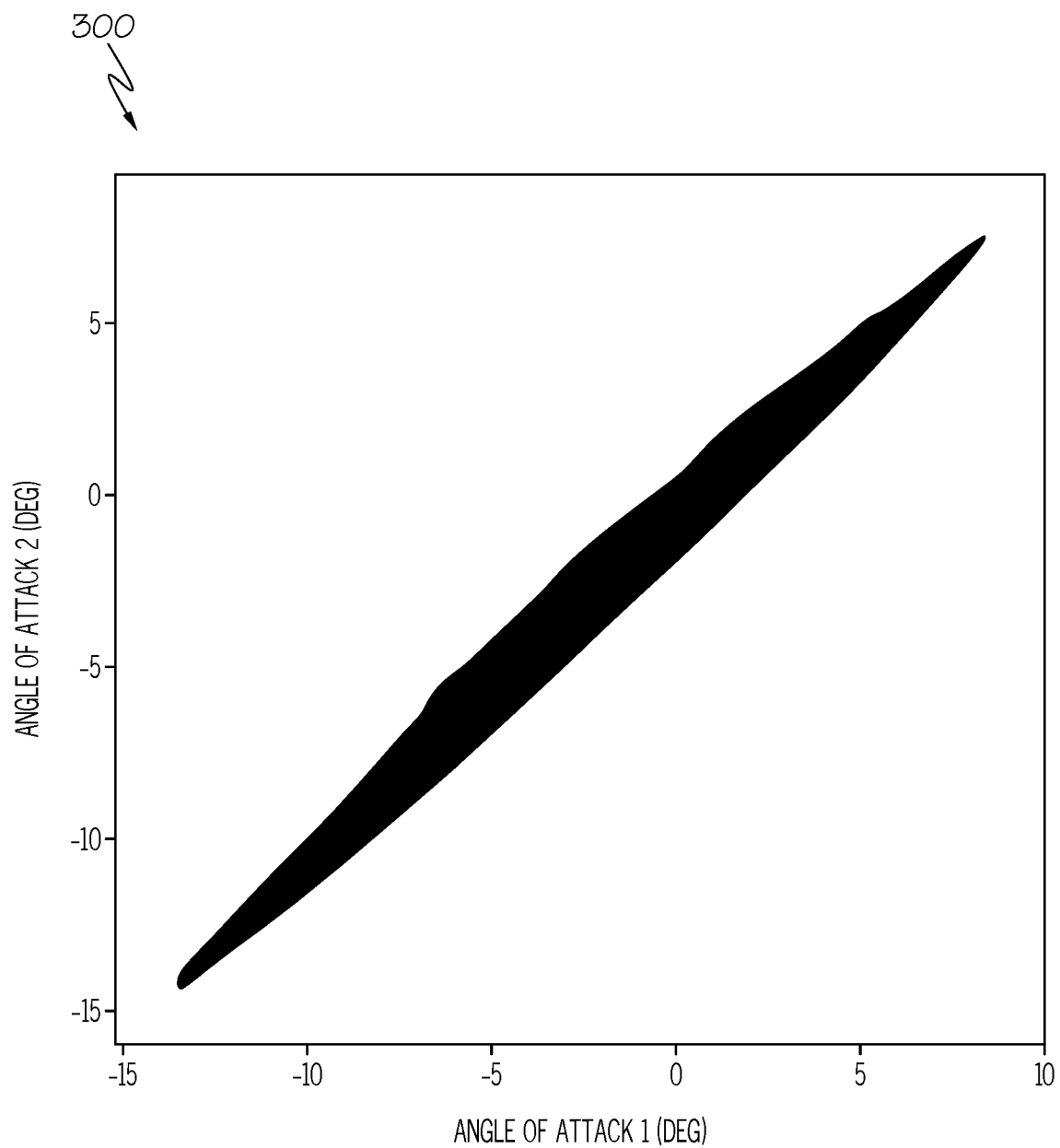
FIG. 3 depicts an exemplary probable relationship between two sensors probabilistically determined based on a relationship between historical output data for the respective sensors in accordance with one embodiment.

FIG. 3 depicts an exemplary probable operation region 300 for a particular confidence or probability level (e.g., 95%) determined based on the relationship between historical output data for two data sources 102, 104 for a particular set of operating conditions. In this regard, FIG. 3 depicts an example where the two data sources 102, 104 to be analyzed are redundant sensors having the same type, namely, two different angle of attack sensors. As depicted in FIG. 3, the degree of relation or variability between the angle of attack values output by the angle of attack sensors varies with respect to the angle of attack value. Thus, depending on the output value of one of the angle of attack sensors, a probable range of angle of attack values likely to be output by the other angle of attack sensors may be determined with the desired level of confidence or reliability using the probable operation region 300. For example, given a relatively high or a relatively low angle of attack value from one angle of attack sensor, a narrower range for the expected of angle of attack measurement value output by the other angle of attack sensor may be determined, while at more moderate angle of attack values, the probable range for the expected behavior of the other angle of attack sensor increases.

Figure 4:
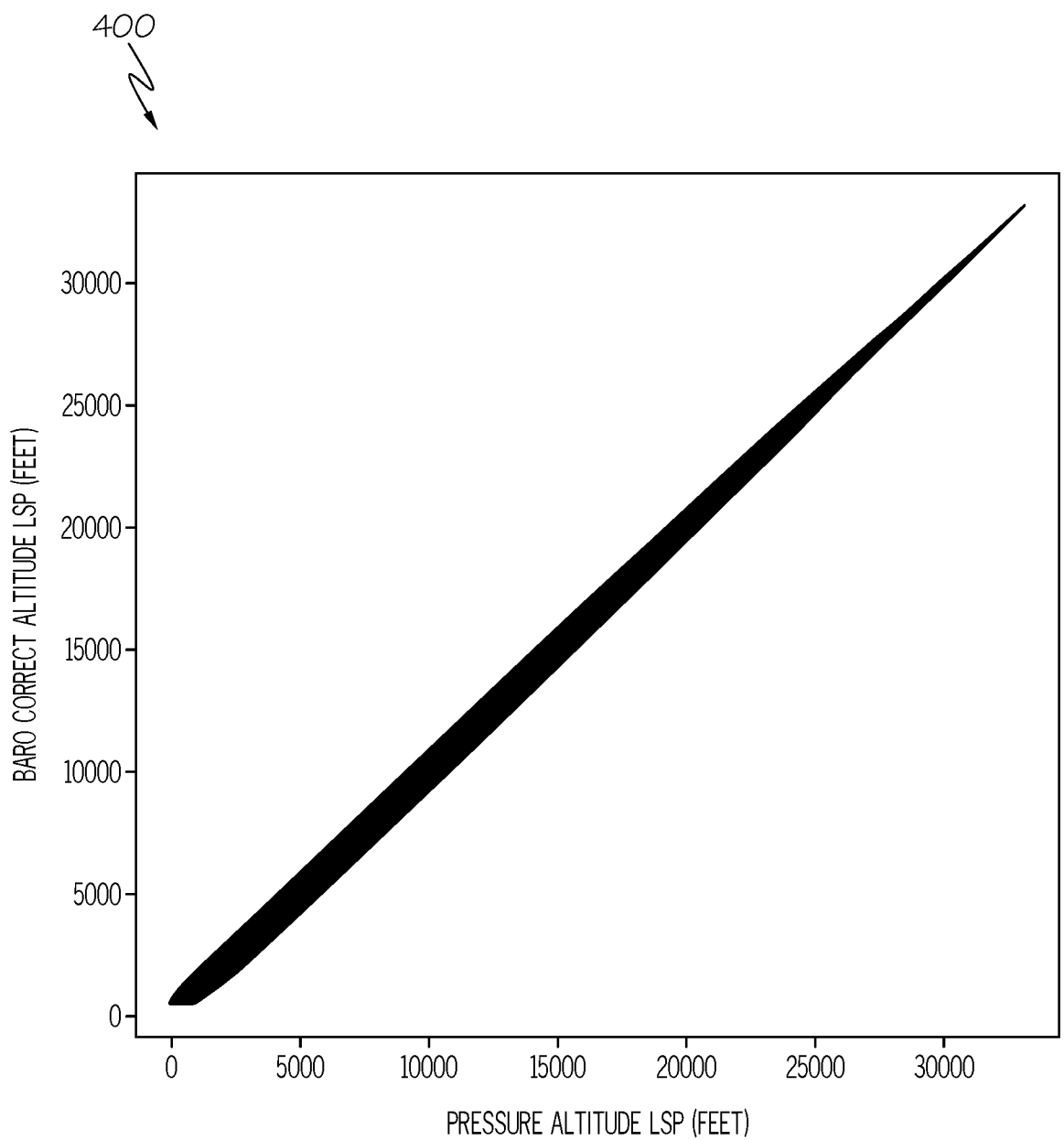
FIG. 4 depicts an exemplary probable relationship between a sensor output and a calculated metric probabilistically determined based on a relationship between historical output data for the sensor and corresponding historical data for the calculated metric in accordance with one embodiment.

FIG. 4 depicts another exemplary probable operation region 400 depicting a probable relationship between a sensed measurement value output by one data source and a calculated (or computed) data value output by another data source. For example, FIG. 4 depicts the probable relationship between the altitude measured by an altitude sensor (or altimeter) onboard the aircraft and a barometric-corrected altitude calculated using a barometer. As depicted in FIG. 4, the probable operation region 400 converges as the altitude values increase, such that the probable range for one of the altitude values decreases as the value for the other altitude value increases, or vice versa.

Referring again to FIG. 2, the data validation process 200 compares the current output data value from the second data source to the probable range determined based on the current output data value from the first data source to verify or otherwise validate that the current output data value is within the probable range (task 208). When the current output values from the two different data sources are within the probable operation region, the data validation process 200 determines the data sources are exhibiting the expected behavior with respect to one another in accordance with their historical operational data and validates or otherwise verifies the behavior of the data sources with respect to one another (task 210). In this regard, it should be noted that the validation of two data sources with respect to one another may be utilized to perform subsequent diagnostics, or override or inform other validation tests or logic.

When the current output data values being compared are not within their probable operation region, the data validation process 200 detects or otherwise identifies an anomalous condition and attempts to diagnose or otherwise identify the source of the detected data anomaly before providing one or more indicia of the detected data anomaly (tasks 212, 214). For example, referring to FIG. 3, if the current angle of attack value output by the first angle of attack sensor is −10°, an anomalous condition may be detected if the current angle of attack value output by the second angle of attack sensor is less than −13° or greater than −10°. That said, if the current angle of attack value output by the first angle of attack sensor is 00, an anomalous condition may be detected if the current angle of attack value output by the second angle of attack sensor is less than −3° or greater than +1°. In this regard, it should be noted that the amount of the deviation between the output value of the first angle of attack sensor and the output value of the second angle of attack sensor that results in a detected anomaly is smaller at extremes of the measurement range, thereby enabling detection of an anomalous condition that could otherwise go undetected by a simple logical comparison to a static threshold value across the entire measurement range. Conversely, the tolerated deviation between the output value of the first angle of attack sensor and the output value of the second angle of attack sensor before resulting in a detected anomaly is increased near the center of the measurement range, thereby reducing the likelihood of false positives where an anomaly could otherwise be incorrectly detected when using a static threshold value across the entire measurement range.

Similarly, referring to FIG. 4, if the currently calculated barometric-corrected altitude is 4000 feet, an anomalous condition may be detected if the current altitude measurement value output by an onboard altitude sensor deviates from the barometric-corrected altitude value by more than 500 feet (e.g., less than 3,500 feet or greater than 4,500 feet). That said, if the currently calculated barometric-corrected altitude is 30,000 feet, an anomalous condition may be detected if the current altitude measurement value output by the onboard altitude sensor deviates from the barometric-corrected altitude value by more than 100 feet (e.g., less than 29,900 feet or greater than 30,100 feet). In this regard, using a static threshold value for a simple logical comparison between such ostensibly correlative values across their full measurement would likely result in either an excessive number of false positives (e.g., if the threshold deviation were small enough to detect anomalous deviations at higher altitudes) or an inability to detect anomalous conditions (e.g., if the threshold deviation were conservative enough to avoid false positives at lower altitudes).

Referring again to FIG. 2, and with reference to FIG. 1, in one or more embodiments, when an anomalous condition is detected between two data sources 102, 104, the output from one or more additional reference data sources may be compared to the respective outputs of the two data sources 102, 104 to identify which one of the data sources 102, 104 is most likely to be exhibiting the anomaly. For example, if a discrepancy is detected between two angle of attack sensors, the respective outputs of the angle of attack sensors may be individually compared to a pitch angle or other output from an inertial reference system onboard the aircraft to identify which of the angle of attack values is not within a probable range determined based on the current pitch angle and the historical relationship between the angle of attack and the pitch angle. In this regard, it should be noted that there are numerous different types of comparisons and diagnostic logic that may be implemented in practical embodiments, and the examples described herein are not intended to be exhaustive nor limiting.

In exemplary embodiments, once the data source 102, 104 exhibiting the anomalous condition is identified, the processing system 108 provides one or more graphical indicia of the anomalous condition with respect to that data source 102, 104 on a display device 110 onboard the aircraft. For example, a graphical representation of the output data value from a respective data source 102, 104 may be faded, desaturated, or otherwise rendered using a visually distinguishable characteristic that conveys or otherwise indicates potential unreliability. In other embodiments, the processing system 108 render or otherwise display a graphical element proximate to, adjacent to, or overlying the graphical representation of the output data value to indicate that the displayed data value is potentially unreliable. In other embodiments, processing system 108 may render or otherwise display a textual notification on the display device 110 that identifies the potentially anomalous data source or otherwise describes the anomalous condition (e.g., by identifying the compared data values that are not exhibiting their expected behavioral relationship). In yet other embodiments, the processing system 108 may remove or mask the graphical representation of the output data value from the display device 110. Additionally, in some embodiments, the processing system 108 may provide an auditory notification to a pilot via an audio output device 110 that identifies the data source diagnosed as being potentially anomalous to the pilot.

As described above, although the data validation process 200 may be described herein the context of comparing two output data values for ease of explanation, in practice, the data validation process 200 may be extended to any level of dimensionality that is desired to analyze relationships across multiple different data sources or data values in real-time. Additionally, in some embodiments, the data validation process 200 may incorporate time as a variable to validate the temporal behavior of data sources with respect to time. In this regard, in addition to determining a probable region for an output data value based on the historical operational data for particular operating conditions, the historical operational data associated with the output data values or data sources being validated with respect to one another may also be analyzed with respect to time, to thereby influence the probable range of output data values based on preceding output data values. For example, one or more statistical metrics (e.g., standard deviation, variance, and/or the like) may be determined for the output data values for the current aircraft status, and then utilize to adjust or modify the probable range of values for the current output of a data source 102, 104 based on one or more preceding output data values from one or more of the data sources 102, 104. In this regard, the data validation process 200 may validate that the temporal behavior of the data source(s) 102, 104 matches their expected temporal behavior while also being correlative to one another in a manner that is consistent with their historical operational data.

For example, some output data values may exhibit relatively high variance in one flight phase (e.g., cruise) while exhibiting a relatively low variance in another flight phase (e.g., climb). Thus, while the aircraft is in the climbing phase, the probable operation region for a current pair of output data values may be augmented or otherwise adjusted to reduce the probable range of values based on the preceding pair of output data values to reflect that a relatively low deviation or variance between successive samples is unlikely in the climbing flight phase. In this regard, accounting for the temporal behavior across successive sample may reduce the likelihood of an anomalous condition going undetected when the temporal behavior of the data sources is inconsistent with historical operational data. For example, the output data values from redundant sensors could otherwise fall within a threshold amount of deviation such that an anomalous condition would not normally be detected but one or more of the sensors could be exhibiting a high level of variability with respect to time that suggests the sensor's output may be unreliable given the expected variability for the current flight phase. Conversely, when the aircraft is in the climbing phase, the probable operation region for a current pair of output data values may be augmented or otherwise adjusted to increase the probable range of values based on the preceding pair of output data values to reflect that a higher deviation or variance between successive samples is more likely in the climbing flight phase. In this regard, accounting for the temporal behavior across successive sample may reduce the likelihood of false positives when the temporal behavior of the data sources is otherwise consistent with historical operational data.

In some embodiments, the temporal behavior of data sources may be compared to historical data to verify that they are exhibiting at least a minimum amount of variability that is consistent with historical operational data, thereby enabling detection of an anomalous condition when sensors are frozen or otherwise in a persistent state where the output data values would not otherwise indicate an anomaly. In this regard, a probable range for one or more statistical metrics quantifying the relationship between two different data values with respect to the data values may be determined and utilized to detect or otherwise identify an anomalous condition when the current relationship between the real-time data values is not exhibiting the expected temporal behavior.

Figure 5:
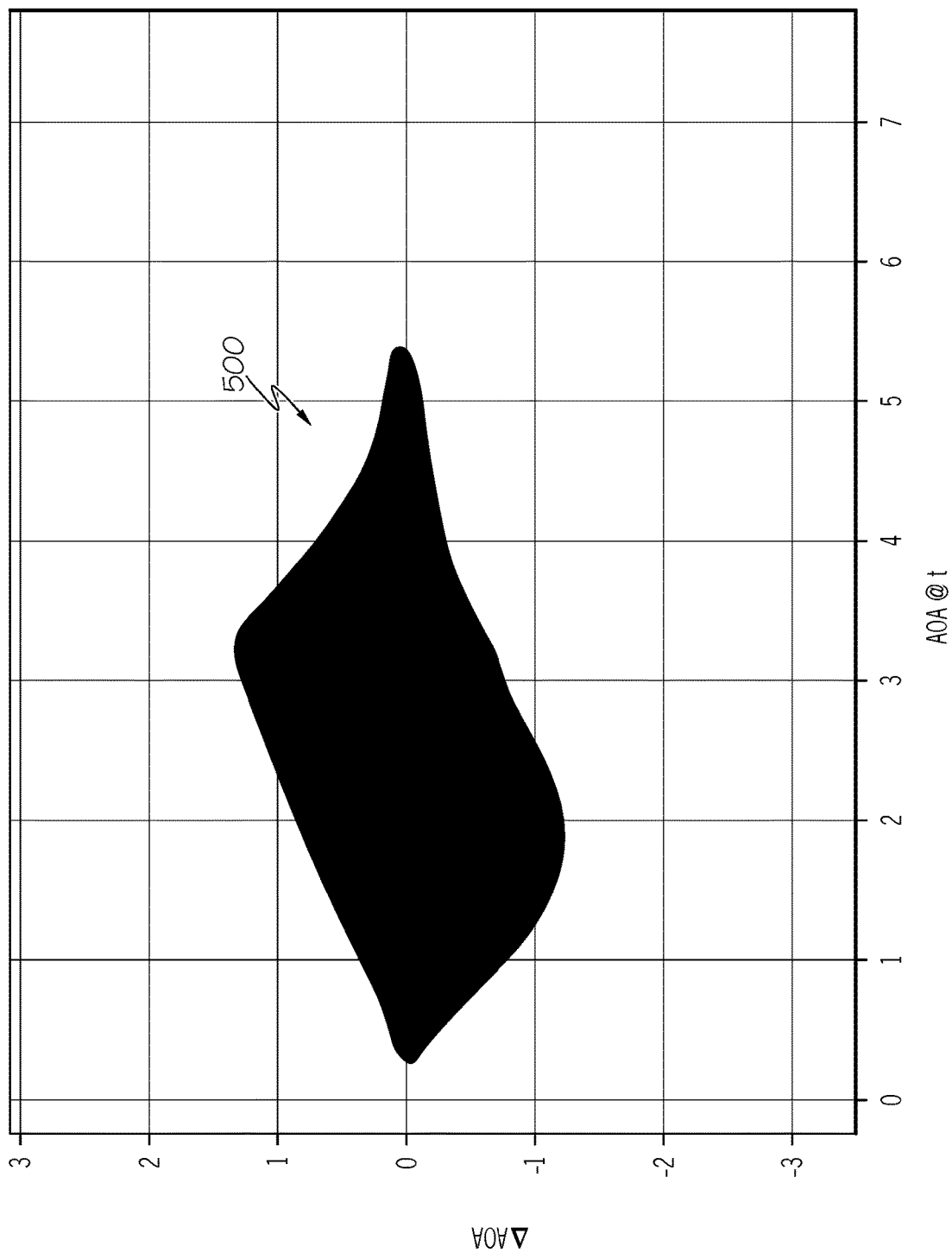
FIG. 5 depicts an exemplary probable relationship between a current angle of attack measurement value and a calculated difference between a current angle of attack measurement value and a preceding angle of attack measurement value from an angle of attack sensor in accordance with one embodiment.
Figure 6:
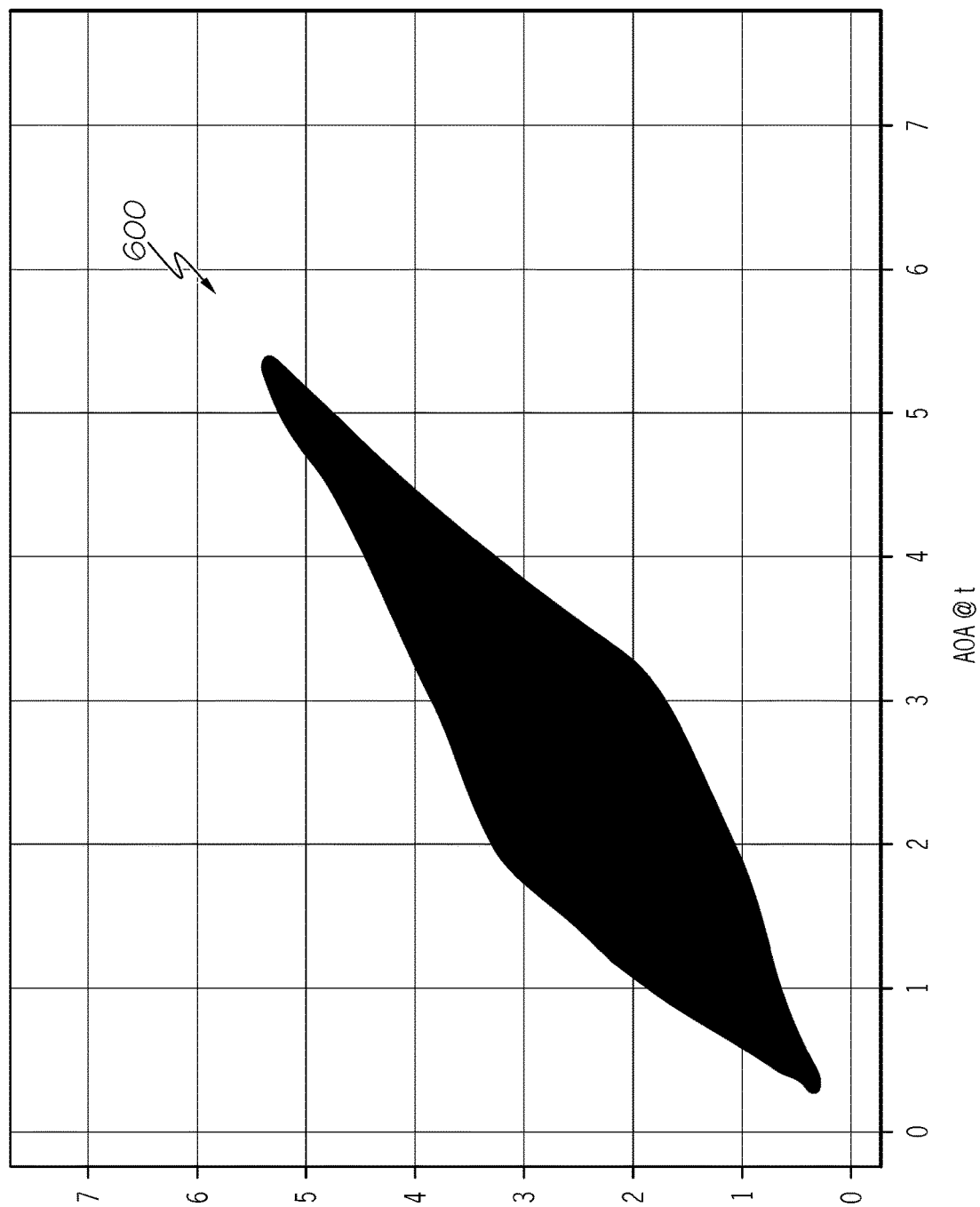
FIG. 6 depicts an exemplary probable relationship between a current angle of attack measurement value and a preceding angle of attack measurement value from an angle of attack sensor in accordance with one embodiment.
Figure 7:
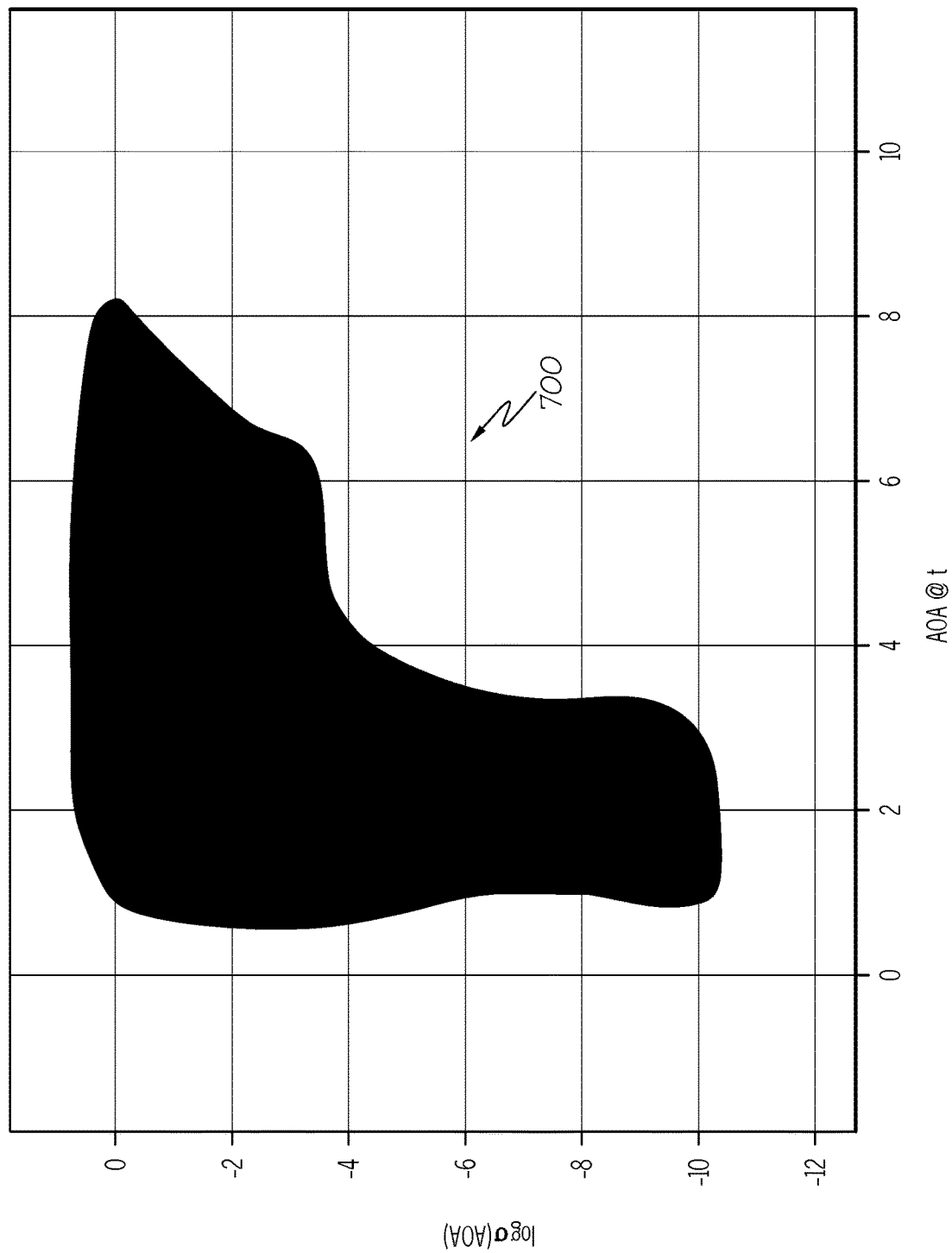
FIG. 7 depicts an exemplary probable relationship between a current angle of attack measurement value and a calculated metric indicative of expected temporal behavior of an angle of attack sensor in accordance with one embodiment.

FIGS. 5-7 depict probable operation regions for a particular confidence or probability level determined based on the temporal relationship or behavior exhibited by historical output data for an individual data source. For example, FIG. 5 depicts a probable operating region 500 depicting a probable relationship between a current angle of attack measurement value (AOA @ t) output by an angle of attack sensor and a calculated (or computed) difference (ΔAOA) between a current angle of attack measurement value and a preceding angle of attack measurement value from the angle of attack sensor during an en route flight phase. In this regard, if the current angle of attack measurement value is equal to 2.5 degrees, the probable range for preceding measurement values for the angle of attack sensor may be determined to be between about 1.5 and about 3.5 degrees, and an anomalous condition may be detected when the preceding attack measurement value is less than 1.5 degrees or greater than 3.5 degrees. Conversely, a probable range for the current angle of attack measurement value representing the expected temporal behavior of the angle of attack sensor may be determined based on the difference between the current angle of attack measurement value and the preceding angle of attack measurement value, and an anomalous condition may be detected when the current angle of attack measurement value is outside the probable range. Thus, the probable operating region 500 may be utilized to detect an anomalous condition when the angle of attack sensor exhibits an unexpected temporal behavior or variability between successive output values.

FIG. 6 depicts a probable operating region 600 depicting a probable relationship between a current angle of attack measurement value (AOA @ t) output by an angle of attack sensor and a preceding angle of attack measurement value (AOA @ t−1) from the angle of attack sensor during an en route flight phase. For example, if the preceding angle of attack measurement value is equal to 2.5 degrees, a probable range for the current measurement value may be determined to be between about 1.5 and about 3.5 degrees, and an anomalous condition may be detected when the current angle of attack measurement value is less than 1.5 degrees or greater than 3.5 degrees. Conversely, if the current angle of attack measurement value is equal to about 3.2 degrees, an anomalous condition may be detected when the preceding angle of attack measurement value is less than 2 degrees or greater than 4 degrees. Similar to probable operating region 500, the probable operating region 600 may be utilized to detect an anomalous condition when the angle of attack sensor exhibits an unexpected temporal behavior or variability between successive output values.

FIG. 7 depicts a probable operating region 700 depicting a probable relationship between a current angle of attack measurement value (AOA @ t) output by an angle of attack sensor and a calculated (or computed) metric indicative of expected temporal behavior of the angle of attack sensor, which in the illustrate embodiment is the value of the logarithm of the standard deviation of the preceding 5 angle of attack measurement values output by the angle of attack sensor. In this regard, the calculated logarithm of the standard deviation of the preceding 5 angle of attack measurement values may be utilized to determine a probable range of for the current angle of attack measurement value, and an anomalous condition may be detected when the current attack measurement value is outside the probable range. For example, if the value of the logarithm of the standard deviation of the preceding 5 angle of attack measurement values is equal to −10, an anomalous condition may be detected if the current angle of attack measurement value is less than 1 degree or greater than 3 degrees. Conversely, if the value of the logarithm of the standard deviation of the preceding 5 angle of attack measurement values is equal to 0, the probable range for the current angle of attack measurement value broadens to accommodate for a wider range of potential values for the current angle of attack measurement value without detecting an anomaly. Thus, the preceding temporal behavior of the angle of attack sensor may be utilizes to predict, estimate, or otherwise determine a probable range for the current measurement values indicative of the angle of attack sensor functioning normally or non-anomalously. As a result, an anomaly with respect to an angle of attack sensor that is not exhibiting the expected temporal behavior may be detected even though the output of the angle of attack sensor may otherwise fail to indicate an anomaly using conventional comparator-based approaches (e.g., due to absence of at least a threshold mismatch with respect to another angle of attack sensor).

Figure 8:
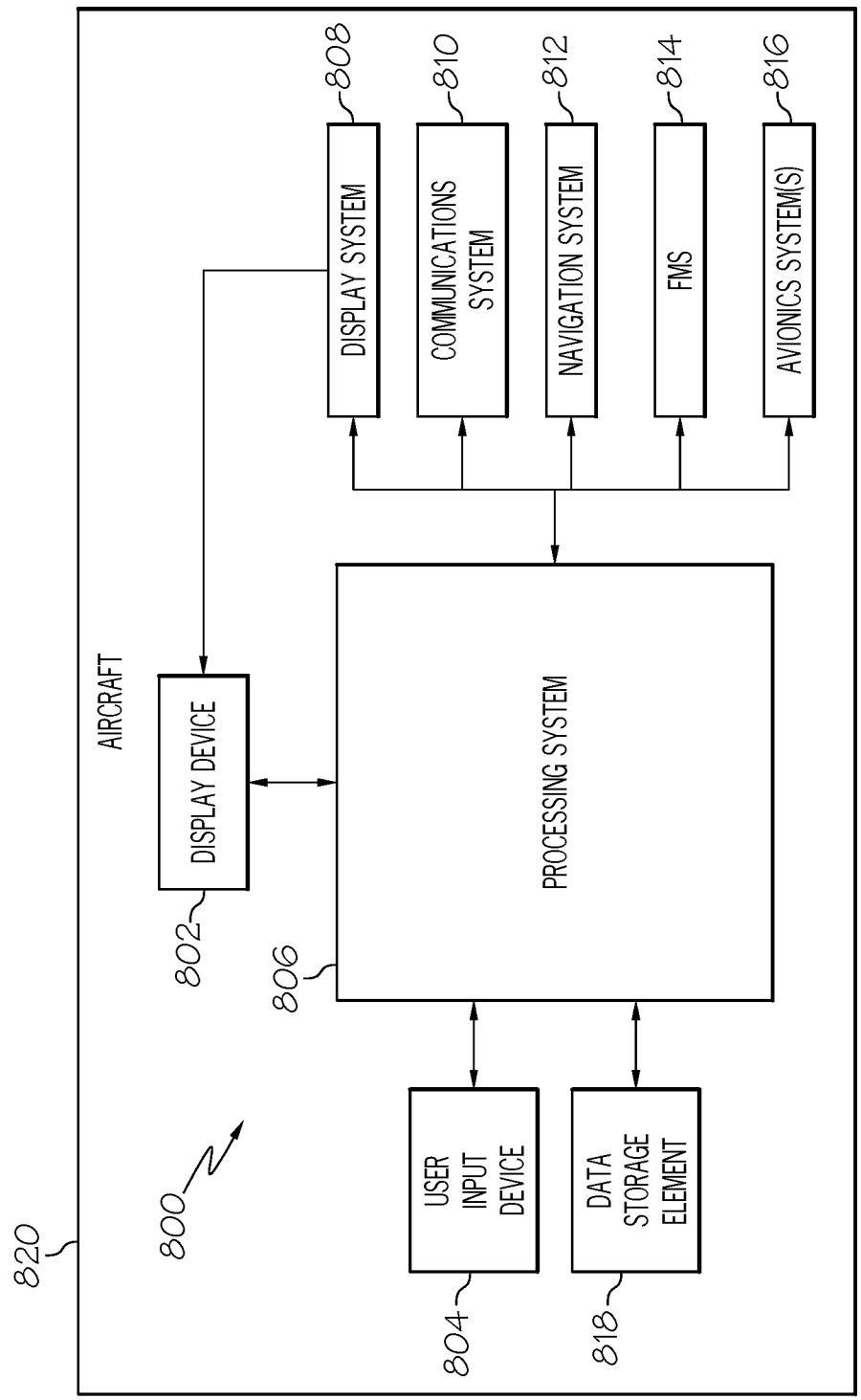
FIG. 8 depicts an exemplary embodiment of an aircraft system suitable for implementing the data validation process of FIG. 2 in accordance with one or more embodiments.

FIG. 8 depicts an exemplary embodiment of an aircraft system 800 suitable for implementing the data validation process 200 with respect to data sources onboard an aircraft 820. The illustrated aircraft system 800 includes, without limitation, a display device 802, one or more user input devices 804, a processing system 806, a display system 808, a communications system 810, a navigation system 812, a flight management system (FMS) 814, one or more avionics systems 816, and a data storage element 818 suitably configured to support operation of the system 800.

In exemplary embodiments, the display device 802 is realized as an electronic display capable of graphically displaying flight information or other data associated with operation of the aircraft 820 under control of the display system 808 and/or processing system 806. In this regard, the display device 802 is coupled to the display system 808 and the processing system 806, wherein the processing system 806 and the display system 808 are cooperatively configured to display, render, or otherwise convey one or more graphical representations or images associated with operation of the aircraft 820 on the display device 802. The user input device 804 is coupled to the processing system 806, and the user input device 804 and the processing system 806 are cooperatively configured to allow a user (e.g., a pilot, co-pilot, or crew member) to interact with the display device 802 and/or other elements of the system 800, as described herein. Depending on the embodiment, the user input device(s) 804 may be realized as a keypad, touchpad, keyboard, mouse, touch panel (or touchscreen), joystick, knob, line select key or another suitable device adapted to receive input from a user. In some embodiments, the user input device 804 includes or is realized as an audio input device, such as a microphone, audio transducer, audio sensor, or the like, that is adapted to allow a user to provide audio input to the system 800 in a "hands free" manner without requiring the user to move his or her hands, eyes and/or head to interact with the system 800.

The processing system 806 generally represents the hardware, software, and/or firmware components configured to facilitate communications and/or interaction between the elements of the aircraft system 800 and perform additional tasks and/or functions to support the data validation process 200 of FIG. 2 during operation of the aircraft system 800, as described herein. Depending on the embodiment, the processing system 806 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 806 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 806 includes processing logic that may be configured to carry out the functions, techniques, and processing tasks associated with the operation of the aircraft system 800, as described herein. Furthermore, the steps of a method or algorithm described in connection with the embodiments disclosed herein may be embodied directly in hardware, in firmware, in a software module executed by the processing system 806, or in any practical combination thereof. For example, in one or more embodiments, the processing system 806 includes or otherwise accesses a data storage element 818 (or memory), which may be realized as any sort of non-transitory short- or long-term storage media capable of storing programming instructions for execution by the processing system 806. The code or other computer-executable programming instructions, when read and executed by the processing system 806, cause the processing system 806 to support or otherwise perform certain tasks, operations, and/or functions described herein in the context of the data validation process 200. Depending on the embodiment, the data storage element 818 may be physically realized using RAM memory, ROM memory, flash memory, registers, a hard disk, or another suitable data storage medium known in the art or any suitable combination thereof.

The display system 808 generally represents the hardware, software, and/or firmware components configured to control the display and/or rendering of one or more navigational maps and/or other displays pertaining to operation of the aircraft 820 and/or onboard systems 810, 812, 814, 816 on the display device 802. In this regard, the display system 808 may access or include one or more databases suitably configured to support operations of the display system 808, such as, for example, a terrain database, an obstacle database, a navigational database, a geopolitical database, a terminal airspace database, a special use airspace database, or other information for rendering and/or displaying navigational maps and/or other content on the display device 802.

Still referring to FIG. 8, in an exemplary embodiment, the processing system 806 is coupled to the navigation system 812, which is configured to provide real-time navigational data and/or information regarding operation of the aircraft 820. The navigation system 812 may be realized as a global navigation satellite system (e.g., a global positioning system (GPS), a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 812, as will be appreciated in the art. The navigation system 812 is capable of obtaining and/or determining the instantaneous position of the aircraft 820, that is, the current (or instantaneous) location of the aircraft 820 (e.g., the current latitude and longitude) and the current (or instantaneous) altitude or above ground level for the aircraft 820. The navigation system 812 is also capable of obtaining or otherwise determining the heading of the aircraft 820 (i.e., the direction the aircraft is traveling in relative to some reference). In the illustrated embodiment, the processing system 806 is also coupled to the communications system 810, which is configured to support communications to and/or from the aircraft 820. For example, the communications system 810 may support communications between the aircraft 820 and air traffic control or another suitable command center or ground location. In this regard, the communications system 810 may be realized using a radio communication system and/or another suitable data link system.

In an exemplary embodiment, the processing system 806 is also coupled to the FMS 814, which is coupled to the navigation system 812, the communications system 810, and one or more additional avionics systems 816 to support navigation, flight planning, and other aircraft control functions in a conventional manner, as well as to provide real-time data and/or information regarding the operational status of the aircraft 820 to the processing system 806. Although FIG. 8 depicts a single avionics system 816, in practice, the aircraft system 800 and/or aircraft 820 will likely include numerous avionics systems for obtaining and/or providing real-time flight-related information that may be displayed on the display device 802 or otherwise provided to a user (e.g., a pilot, a co-pilot, or crew member). For example, practical embodiments of the aircraft system 800 and/or aircraft 820 will likely include one or more of the following avionics systems suitably configured to support operation of the aircraft 820: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. In various embodiments, the processing system 806 may obtain information pertaining to the current location and/or altitude of the aircraft 820 and/or other operational information characterizing or otherwise describing the current operational context or status of the aircraft 820 from one or more of the onboard systems 808, 810, 812, 814, 816, and the current operational context may be utilized by the processing system 806 to detect anomalies between data sources based on the current operational context (e.g., the current flight phase, etc.).

It should be understood that FIG. 8 is a simplified representation of the aircraft system 800 for purposes of explanation and ease of description, and FIG. 8 is not intended to limit the application or scope of the subject matter described herein in any way. It should be appreciated that although FIG. 8 shows the various elements of the system 800 being located onboard the aircraft 820 (e.g., in the cockpit), in practice, one or more of the elements of the system 800 may be located outside the aircraft 820 (e.g., on the ground as part of an air traffic control center or another command center) and communicatively coupled to the remaining elements of the aircraft system 800 (e.g., via a data link and/or communications system 810). For example, in some embodiments, the data storage element 818 may be located outside the aircraft 820 and communicatively coupled to the processing system 806 via a data link and/or communications system 810. Furthermore, practical embodiments of the aircraft system 800 and/or aircraft 820 will include numerous other devices and components for providing additional functions and features, as will be appreciated in the art. In this regard, it will be appreciated that although FIG. 8 shows a single display device 802, in practice, additional display devices may be present onboard the aircraft 820. Additionally, it should be noted that in other embodiments, features and/or functionality of processing system 806 described herein can be implemented by or otherwise integrated with the features and/or functionality provided by the FMS 814. In other words, some embodiments may integrate the processing system 806 with the FMS 814. In yet other embodiments, various aspects of the subject matter described herein may be implemented by or at an electronic flight bag (EFB) or similar electronic device that is communicatively coupled to the processing system 806 and/or the FMS 814.

Referring to FIG. 8 with reference to FIGS. 1-2, the processing system 806 and/or the FMS 814 may be configured to perform the data validation process 200 with respect to output data provided by any number of different onboard systems 810, 812, 814, 816. In other words, each of the data sources 102, 104 could include or be realized as a different avionics system 810, 812, 814, 816 (or a sensor or another component thereof) onboard the aircraft 820. Thus, the processing system 806 may be able to detect or otherwise identify an anomaly with respect to one of the onboard avionics systems 810, 812, 814, 816 and diagnose the particular onboard avionics system 810, 812, 814, 816 that is the cause of the data anomaly based on discrepancies between outputs of different onboard avionics systems 810, 812, 814, 816.

To briefly summarize, the subject matter described herein allows for detection of anomalous conditions with respect to the output of a sensor, or alternatively, one or more calculated metrics based on a discrepancy between the current values from the respective data sources relative to an expected or probable relationship between the outputs of the data sources derived from historical data. Additionally, the subject matter described herein is not limited to comparisons between two data sources or sensors, and may be extended to any desired level of multi-dimensionality to detect anomalies that could otherwise go undetected using one-to-one logical comparisons. In such embodiments, further comparisons may be performed using expected or probable relationships derived from historical data for different respective pairs of data sources to drill down and identify the data source the detected anomaly is attributable to. As described above, in various instances, the probabilistic relationships between data sources functions like an adjustable threshold that dynamically varies based on the current output of one or more of the data sources and/or the current operating conditions or status of the aircraft.

For example, for analysis of redundant or like sensors with respect to one another, the historical output data from the sensors may be analyzed to come up with probabilistic historical model that characterizes the respective sensors behavior with respect to one another, with respect to time, and/or with respect to current operating conditions. In such embodiments, the subject matter described herein supports detecting anomalies in response to data mismatches or situations where one or more of the sensors is not exhibiting an expected temporal behavior or variability across successive samples or refreshing of the output values. The subject matter described herein also allows for data validation and detection of anomalies with respect to computed or derived metrics being compared to sensor outputs in real-time. Thus, data anomalies may be detected with respect to an onboard system performing the computations or algorithms to obtain the calculated metric or the data bus or other communications interface utilized to transmit or communicate the calculated metric calculated by the onboard system.

For the sake of brevity, conventional techniques related to sensors, statistics, data analysis, avionics systems, redundancy, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of monitoring a sensor, the method comprising:
    determining, by a processing system, a probable range for a metric influenced by a behavior of the sensor based at least in part on historical data associated with the sensor and a preceding measurement value output by the sensor, wherein the probable range for the metric represents an expected temporal behavior of the sensor;
    determining, by the processing system, a current value for the metric based on a current measurement value output by the sensor;
    identifying, by the processing system, an anomalous condition with respect to the sensor when the sensor is exhibiting an unexpected temporal behavior across successive samples based on a relationship between the current value for the metric indicative of a current behavior of the sensor and the probable range; and
    providing a graphical indication of the anomalous condition on a display device.

2. The method of claim 1, wherein:
    determining the probable range comprises determining an expected relationship between outputs of the sensor and a second sensor based at least in part on historical output data associated with the sensor and historical output data associated with the second sensor;
    determining a current relationship between the current measurement value output by the sensor and a current output of the second sensor; and
    identifying the anomalous condition comprises detecting the anomalous condition based on a discrepancy between the current relationship and the expected relationship.

3. The method of claim 1, wherein:
    determining the probable range comprises determining an expected relationship between a first variable computed based on output of the sensor and a second variable computed based on output of a second sensor based at least in part on historical values for the first variable and historical values for the second variable; and identifying the anomalous condition comprises detecting the anomalous condition based on a discrepancy between a current relationship between a current value for the first variable calculated based on the current measurement value output by the sensor and a current value for the second variable calculated based on a current output of the second sensor and the expected relationship.

4. The method of claim 1, further comprising determining a current flight phase associated with an aircraft having the sensor onboard, wherein:

determining the probable range comprises determining a probable range of values for the metric based at least in part on a subset of the historical data associated with the current flight phase; and identifying the anomalous condition comprises identifying the anomalous condition when the current value is outside the probable range of values.

5. The method of claim 1, further comprising obtaining a current output value from a second sensor, wherein:

determining the probable range comprises determining a probable range of values for the metric based at least in part on the current output value from the second sensor and a relationship between output of the second sensor and output of the sensor identified from the historical data; and identifying the anomalous condition comprises identifying the anomalous condition when the current value is outside the probable range of values.

6. The method of claim 1, wherein:

determining the probable range comprises determining a probable range of measurement values for the sensor based at least in part on a preceding output measurement value from the sensor; and identifying the anomalous condition comprises identifying the anomalous condition when the current measurement value from the sensor is outside the probable range of values.

7. The method of claim 1, wherein:

determining the probable range comprises determining an expected relationship between outputs of the sensor and a second sensor based at least in part on historical output data associated with the sensor and historical output data associated with the second sensor; and the expected relationship dynamically varies based on at least one of the current measurement value output by the sensor and a current output of the second sensor.

8. The method of claim 1, further comprising identifying a current status of a vehicle having the sensor onboard, wherein:

determining the probable range comprises determining an expected value for a statistical metric associated with output of the sensor based on the historical data associated with the current status; and identifying the anomalous condition comprises:

calculating a current value for the statistical metric based on the current measurement value output by the sensor; and detecting the anomalous condition based on a relationship between the current value and the expected value.

9. The method of claim 8, wherein the vehicle comprises an aircraft and the current status comprises a current flight phase.

10. The method of claim 1, further comprising diagnosing a cause of the anomalous condition based at least in part on the current value for the metric.

11. The method of claim 10, wherein:

determining the probable range comprises determining a probable range of values for the metric based at least in part on a current output value from a first data source and a relationship between output from the first data source and the metric identified from the historical data;

identifying the anomalous condition comprises identifying the anomalous condition when current value for the metric indicative is outside the probable range of values; and diagnosing the cause of the anomalous condition comprises:

determining a second probable range of values for the metric based at least in part on a second current output value from a second data source and a second relationship between output from the second data source and the metric identified from the historical data; and identifying the sensor as the cause of the anomalous condition when the current value for the metric is outside the second probable range of values.

12. A method of detecting data anomalies, the method comprising:

obtaining, by a processing system, a first value for a first output from a first data source onboard an aircraft;

obtaining, by the processing system, a second value for a second output from a second data source onboard the aircraft;

determining, by the processing system, a probable range of values representing an expected temporal behavior for the second output based at least in part on the first value and a historical relationship between the first output and the second output wherein the probable range dynamically varies based on the first value;

detecting, by the processing system, an anomalous condition when the second value is outside the probable range of values; and initiating a remedial action in response to detecting the anomalous condition.

13. The method of claim 12, further comprising identifying a current flight phase associated with the aircraft, wherein determining the probable range of values comprises determining the probable range of values based at least in part on the first value and the historical relationship between the first output and the second output while in the current flight phase.

14. The method of claim 12, further comprising obtaining current operating conditions associated with the aircraft, wherein determining the probable range of values comprises determining the probable range of values based at least in part on the first value and the historical relationship between the first output and the second output for the current operating conditions.

15. The method of claim 12, wherein determining the probable range of values comprises determining the probable range of values for the second output based at least in part on a preceding value for one of the first output and the second output.

16. The method of claim 12, wherein determining the probable range of values comprises:

determining a probable operating region for the first and second outputs based on the historical relationship between the first output and the second output; and identifying the probable range of values within the probable operating region based on the first value.

17. The method of claim 12, wherein initiating the remedial action comprises modifying presentation of one of the first output and the second output on a display device onboard the aircraft to indicate the anomalous condition.

18. The method of claim 12, wherein initiating the remedial action comprises disabling one of the first output and the second output to prevent use of the one of the first output and the second output in one or more calculations performed by a system onboard the aircraft.

19. An aircraft system comprising:
a sensor onboard an aircraft to output a first measurement value indicative of a characteristic sensed by the sensor;
a data source onboard the aircraft to output a second value;
a data storage element maintaining historical data indicative of a historical relationship between the sensor and the data source;
a display device onboard the aircraft; and
a processing system coupled to the sensor, the data source, the data storage element, and the display device to determine an expected temporal behavior for the sensor based at least in part on the second value and the historical relationship between the sensor and the data source, wherein the expected temporal behavior comprises a probabilistic relationship between the sensor and the data source that dynamically varies based on the second value, identify an anomalous condition in response to a discrepancy between the first measurement value and the expected temporal behavior, and provide graphical indication of the anomalous condition on the display device.

20. The aircraft system of claim 19, further comprising an onboard system to provide a current status information for the aircraft, wherein the processing system is coupled to the onboard system to determine the expected temporal behavior based on the historical relationship between the sensor and the data source during historical operating conditions corresponding to the current status information.

* * * * *